United States Patent
Ferreol et al.

(10) Patent No.: US 7,477,696 B2
(45) Date of Patent: Jan. 13, 2009

(54) SPACE-TIME CODING DIGITAL TRANSMISSION SYSTEMS AND METHODS

(75) Inventors: Anne Ferreol, Mabennes (FR); Hugues Balp, Lyons (FR)

(73) Assignee: Thales, Paris (FR)

( * ) Notice: Subject to any disclaimer, the term of this patent is extended or adjusted under 35 U.S.C. 154(b) by 729 days.

(21) Appl. No.: 10/312,179

(22) PCT Filed: Jul. 3, 2001

(86) PCT No.: PCT/FR01/02113

§ 371 (c)(1),
(2), (4) Date: Dec. 24, 2002

(87) PCT Pub. No.: WO02/03599

PCT Pub. Date: Jan. 10, 2002

(65) Prior Publication Data

US 2004/0042560 A1 Mar. 4, 2004

(30) Foreign Application Priority Data

Jul. 4, 2000 (FR) .................................. 00 08688

(51) Int. Cl.
*H04L 1/02* (2006.01)

(52) U.S. Cl. ..................... 375/267; 375/265; 375/341; 375/349

(58) Field of Classification Search ......... 375/260–261, 375/265–267, 295, 298–299, 316, 350; 455/101; 370/329, 345, 349
See application file for complete search history.

(56) References Cited

U.S. PATENT DOCUMENTS 5,822,380 A * 10/1998 Bottomley .................. 375/347

(Continued)

OTHER PUBLICATIONS

Naguib et al; "Space-Time Coded Modulation for High Data Rate Wireless Communications"; Phoenix, Arizona; Nov. 3-8, 1997.

(Continued)

*Primary Examiner*—Khanh C Tran
(74) *Attorney, Agent, or Firm*—Lowe Hauptman Ham & Berner, LLP

(57) ABSTRACT

The invention concerns digital signal transmission. In particular, it concerns high speed transmission using layered space-time encoding architecture adapted to all types of propagation channels.

The invention therefore proposes a digital signal transmission system comprising:
  a space-time encoder (1) receiving a flow of data to be transmitted d[i], formatting this data d[i] as symbol vectors $\underline{v}[k]$ of dimension P(P>1) and generating said symbol vectors $\underline{v}[k]$, and
  modulator-transmitters $\{2^P\}_{(1 \leq p \leq P)}$, each receiving one component of the symbol vector $\underline{m}[k]$ output from the space-time encoder (1), applying the constellation of a predetermined modulation to said symbol $m_p[k]$, and converting the symbol obtained $\underline{a}_p[k]$ into a signal $s_p(t)$ presenting time diversity transmitted on said antenna ($24^P$) connected to said transmitter ($2^P$).

To demodulate in parallel the Q signals of the space-time observation $$\underline{y}[k] = \sum_{j=0}^{J-1} H_y(jTs) \cdot \underline{a}[k-j] + \underline{b}_y[k]$$

where $\underline{a}[k]$ is the symbol vector transmitted at instant t=kTs+i, $H_y(t)$ the transfer function taking into account at least the transmission-reception, modulation, channel filters and the transmission-reception antenna gains and $\underline{b}_y(t)$ the noise, the invention proposes a two dimensional suitable estimator-demodulator.

18 Claims, 2 Drawing Sheets

U.S. PATENT DOCUMENTS 6,115,427 A * 9/2000 Calderbank et al. ......... 375/267
6,148,041 A * 11/2000 Dent ........................... 375/340
6,178,196 B1 * 1/2001 Naguib et al. ............... 375/148
6,594,473 B1 * 7/2003 Dabak et al. ................ 455/101

OTHER PUBLICATIONS

Wolniansky et al; "V-BLAST: An Architecture for Realizing Very High Data Rate Over the Rich Scattering Wireless Channel"; Proceeding. URSI International Symposium on Signal Systems and Electronics, XX, XX; Sep. 29, 1998, pp. 295-300.

Golden et al; "Detection Algorithm and Initial Laboratoty Results Using V-BLAST Space-Time Communication Architecture"; Electronics Letters, IEE Stevenage, GB, vol. 35, No. 1; Jan. 7, 1999, pp. 14-16.

* cited by examiner

SPACE-TIME CODING DIGITAL TRANSMISSION SYSTEMS AND METHODS

The invention concerns digital signal transmission. In particular, it concerns high speed transmission using layered space-time encoding architecture adapted to all types of propagation channel.

Traditionally, digital signal transmission is carried out using a system formed from a single transmission antenna and a single reception antenna. The objective is to improve the transmission speed, i.e. to transmit data bits (or symbols) between a transmission system and a reception system with a very high data rate. To do this, Bell Labs proposed the BLAST (Bell Labs Layered Space-Time) architecture that uses in transmission a system of P>1 antennas transmitting independent symbols and in reception a system of N≧P antennas.

Figure 1:
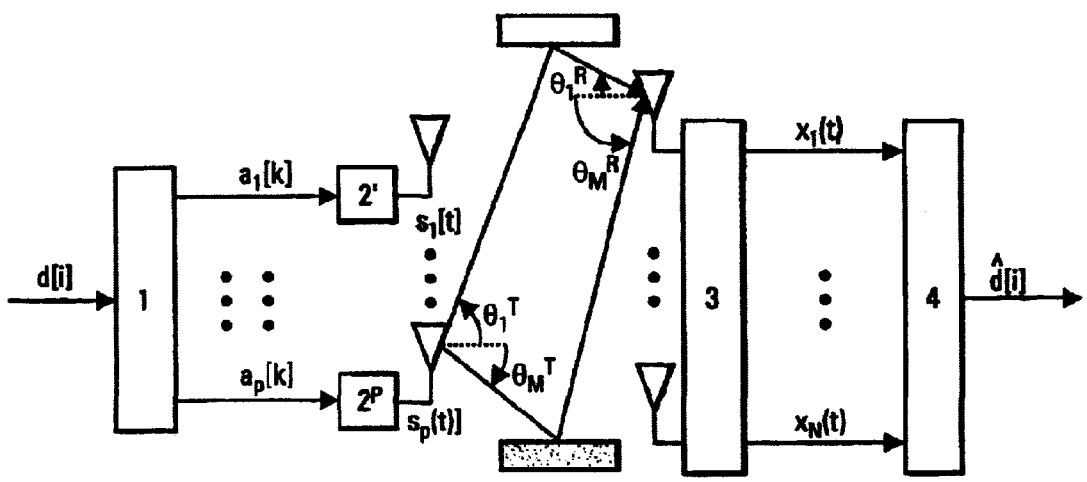

FIG. 1 shows a transmission-reception system using BLAST architecture. The data d[i] to be transmitted is encoded as symbol vectors $\bar{a}[k]=[a_1[k] \ldots a_P[k]]^T$ by the space-time encoder 1. The symbol $a_p[k]$ is the $k^{th}$ symbol transmitted by the $p^{th}$ transmitter $2^p$ ($1 \leq p \leq P$).

The dimension of symbol vector $\bar{a}_p[k]$ is P corresponding to the number P of antennas in the transmission antenna network. These symbol vectors $a_p[k]$ are processed then transmitted as signal vectors s[t] of dimension P by the P modulator-transmitters $\{2^p\}_{(1 \leq p \leq P)}$ on its transmission antenna network $\{24^p\}_{(1 \leq p \leq P)}$.

The signal model in the following expression used in the BLAST architecture is that of a signal with no time memory. In fact, the signal $\bar{s}[k]$ of symbols transmitted at instant k depends only on the symbols $\bar{a}[k]$ transmitted at the same instant by the P modulator-transmitters $\{2^p\}_{(1 \leq p \leq P)}$.

$$\underline{s}(k) = \begin{bmatrix} s_1(k) \\ \vdots \\ s_P(k) \end{bmatrix} = [h_1 \cdots h_P] \cdot \begin{bmatrix} a_1(k) \\ \vdots \\ a_P(k) \end{bmatrix} = \underline{h}(k) \cdot \underline{a}(k)$$

where $h_p$ is the transmission filter of the $p^{th}$ transmitter.

Under these conditions, the data rate can be increased by a factor P since P series of independent symbols are transmitted in parallel. The signals s(t) so transmitted follow M paths (M≧1) and are received by the N antennas of the reception antenna network. Receiver 3 generates the signal vector x(t), of dimension N, received by its antenna network associated with the space-time decoder 4 that can estimate, demodulate and decode the symbols a(k) transmitted, from which it deduces an estimation of the data d[i] transmitted.

Assuming that the transmitted signal is a linear modulation and that this signal is received at the symbol rate, the input-output relation between the transmitters and the receivers is as follows:

$$\underline{x}(k) = \begin{bmatrix} x_1(k) \\ \vdots \\ x_N(k) \end{bmatrix} = H \cdot \begin{bmatrix} a_1(k) \\ \vdots \\ a_P(k) \end{bmatrix} + \underline{b}(k) = H \cdot \underline{a}(k) + \underline{b}(k)$$

where $\bar{a}[k]$ is a vector including the symbols transmitted in parallel, H the transfer function between transmission and reception, $\bar{x}[k]$ a vector including the received signals and $\bar{b}[k]$ the additive noise.

The space-time decoder 4 includes a signal processing system that can estimate the symbols $a_p[k]$. To estimate the $p^{th}$ symbol $a_p[k]$ using the above equation, the following spatial filtering is carried out: $\hat{a}_p(k) = w_p^t \cdot \bar{x}(k)$.

To estimate the weighting vector $w_p$, the article "An architecture for realizing very high data rates over the rich-scattering wireless channel" by Wolniansky, Foschini, Golden and Valenzuela, Proc. ISSE-98, Pisa, Italy, 29 Sep. 1998 summarizes two of these traditional linear estimation detection techniques using the BLAST algorithm estimating this filter. Consequently, by putting $H=[h(1) \ldots h(p)]$, the following two techniques can be carried out:

the jammer cancellation technique: $w_p$ is the solution to the equation system $w_p^t h(i) = \delta_{pi}$ for $1 \leq i \leq P$. The sign $\delta_{pi}$ is the Kronecker symbol satisfying $\delta_{pi}=1$ for p=i and $\delta_{pi}=0$ for p≠1.

the technique maximizing the signal to noise ratio and jammer: the spatial filter must maximize the energy of $\bar{a}_p[k]$ given that the useful symbol is then $a_p[k]$ and the jammer symbols are the other symbols $a_i[k]$ such that i≠p.

After estimating $\hat{a}_p[k]$, the state of the symbol $\hat{a}_p[k]$ is detected and the symbol $\bar{a}[k]$ is deduced. With BPSK (Bi-Phase Shift Keying modulation) the decision is made between the phases 0 or π of the estimated symbol $\tilde{a}[k]$. Once decided, the decoded symbol $\tilde{a}[k]$ is demodulated, the demodulated symbol is equal to 1 or −1.

This linear technique is a readaptation to the BLAST architecture of the MMSE (Minimum Mean Square Error) type linear equalization technique. In this case, a spatial filter, therefore always one-dimensional, is used instead of the time filter to make the estimation.

To improve the linear technique, a DFE (Decision Feedback Equalization) type algorithm is used to carry out the spatial filtering non-linearly. Under these conditions, the components of the symbol vector $\bar{a}[k]$ are estimated one by one, the estimated and detected symbol $a_p[k]$ being removed from the spatial observation vector $\bar{x}[k]$ before estimating the next symbol $a_{p+1}[k]$.

The company Bell Labs designed two techniques based on this principle. The first called V-BLAST is described in the article "An architecture for realizing very high data rates over the rich-scattering wireless channel" by Wolnianski, Foschini, Golden and Valenzuela, Proc. ISSE-98, Pisa, Italy, 29 Sep. 1998.

At each instant k, all components $a_p[k]$ of the symbol vector $\bar{a}(k)$ are estimated and detected. By considering the time k as abscissa and the index p of the transmission sensor as ordinate, the estimation-detection is therefore carried out in the vertical direction, hence the name V-BLAST. By putting $H=[h(1) \ldots h(p)]$, the estimation-detection is carried out in the direction $\{p_1, p_P\}$ such that $h(p_1)^t h(p_1) > \ldots > h(p_P)^t h(p_P)$. The V-BLAST estimation-detection algorithm is therefore carried out according to the following steps:

Initialization: i=1 and $x^1[k]=x[k]$,

In step i: Estimation and detection of the symbol $a_p[k]$:

$\hat{a}_{pi}(k) = w_{pi}^t \cdot x^i(k) \Rightarrow \tilde{a}_{pi}(k)$

Cancellation of the symbol $\bar{a}_{pi}[k]$ of the observations x[k]:

$x^{i+1}[k] = x^i[k] - h(p_i) \tilde{a}_{pi}[k]$

Stop: Move to next instant k=k+1, when i=P,

The second technique was the subject of two European patents EP 0 817 401 and EP 0 951 091. The non-linear estimation-detection algorithm described, the algorithm D-BLAST, only differs from the previous algorithm V-BLAST in that the direction of the estimation-detection of symbols $\bar{a}_{pi}[k]$ is diagonal and no longer vertical.

The non-linear estimation-detection V-BLAST and D-BLAST can only be carried out under certain conditions. These conditions are as follows:

linear modulation without time memory,
demodulation on sampled signals at symbol rate,
transmission of synchronous independent symbols by the P modulator-transmitters,
number of receivers greater than or equal to the number of transmitters (N≧P),
network of transmission-reception antennas either non-colocalized or colocalized with a number of transmitters less than or equal to the number of paths (P≦M), given that a network of colocalized transmission-reception antennas is a network such that the dimension of the transmission antenna network and the dimension of the reception antenna network are much less than the distance between the transmission network and the reception network.

The relation between the transmitted symbols and the received symbols is therefore purely spatial.

This invention avoids or at least reduces these disadvantages, by proposing a transmission system of P modulator-transmitters transmitting symbols that can be estimated on reception with colocalized transmission and reception antenna networks irrespective of the transmission-reception and propagation conditions (modulation, disturbance, etc.).

A first objective is therefore to be able to also estimate the P series of symbols transmitted for a slightly disturbed propagation channel. The relation between the transmitted symbols and the received symbols is purely spatial and, for a slightly disturbed propagation channel, the spatial diversity is non-existent or virtually non-existent.

The invention therefore proposes a digital signal transmission system comprising:

a space-time encoder receiving a flow of data to be transmitted d[i], encoding this data d[i] as symbol vectors $\overline{m}$[k] of dimension P (P>1) and generating said symbol vectors $\overline{m}$[k], and modulator-transmitters $\{2^p\}_{(1 \leq p \leq P)}$, each receiving one component of the symbol vector m[k] output from the space-time encoder, applying the constellation of a predetermined modulation to said symbol $m_p$[k], and converting the symbol obtained $a_p$[k] into a signal $s_p$(t) transmitted on said antenna connected to said transmitter wherein the transmitters are adapted to transmit signals $\overline{s}$(t) with time diversity.

This transmission system operating, for example, via a digital signal transmission method comprising:

a space-time encoding step comprising at least the formatting as symbol vectors $\overline{m}$[k] of dimension P (P>1) of the flow of data to be transmitted d[i], and a modulator-transmission step comprising at least:
application in parallel of the constellation of a predetermined modulation to the P symbols $\overline{m}$[k],
transmission in parallel of the P signals $\overline{s}$(t) obtained from the constellated symbols $\overline{a}$[k] from P spatially separate points, wherein the modulation-transmission step is adapted to transmit the signals $\overline{s}$(t) with time diversity.

In order to estimate the P symbols so transmitted, the invention concerns an estimator-demodulator receiving in parallel N signals v(t) formed from L samples, wherein these signals v(t) represent a space-time observation since each of the N spatial components comprises L samples.

The estimator-demodulator previously described uses, for example, an estimation and demodulation method comprising a step of reception in parallel of N signals v(t) wherein the observation v(t) is space-time since each of the N spatial components comprises L samples.

Figure 2:
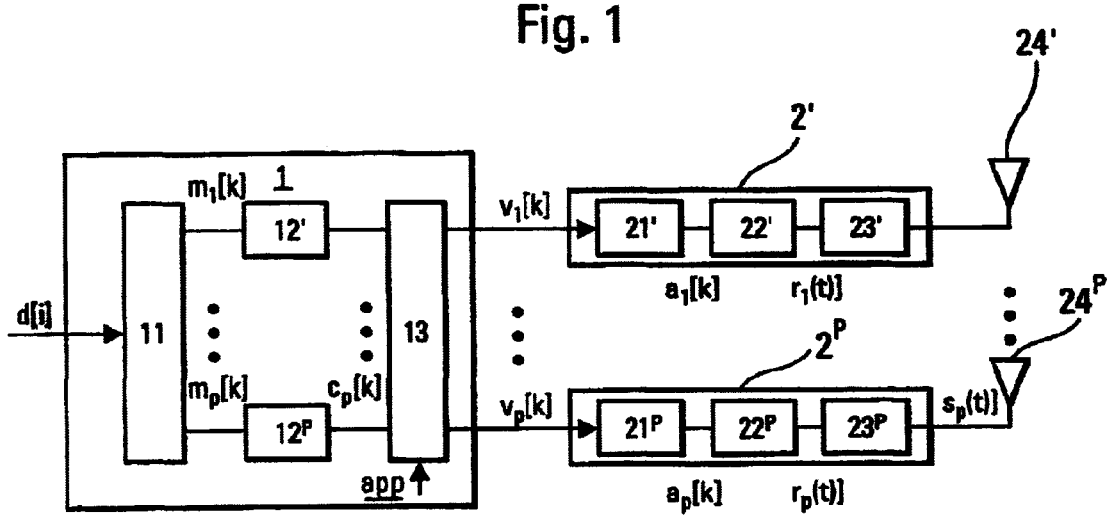
Figures 3A, 3B, 3C:
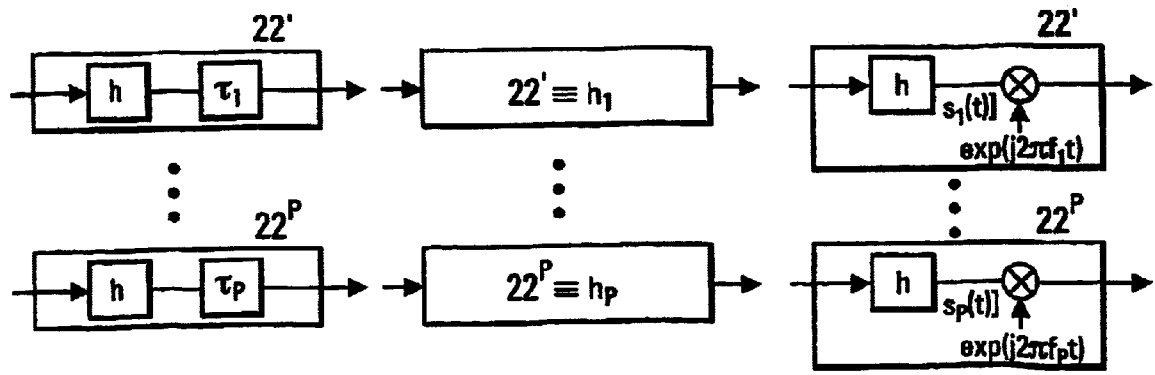
Figure 4:
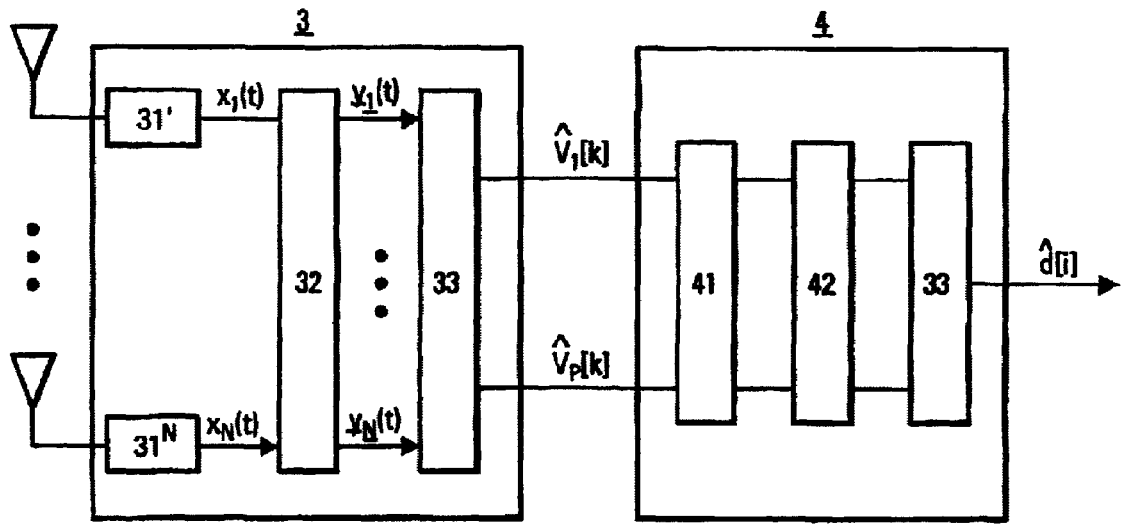
Figure 5A:
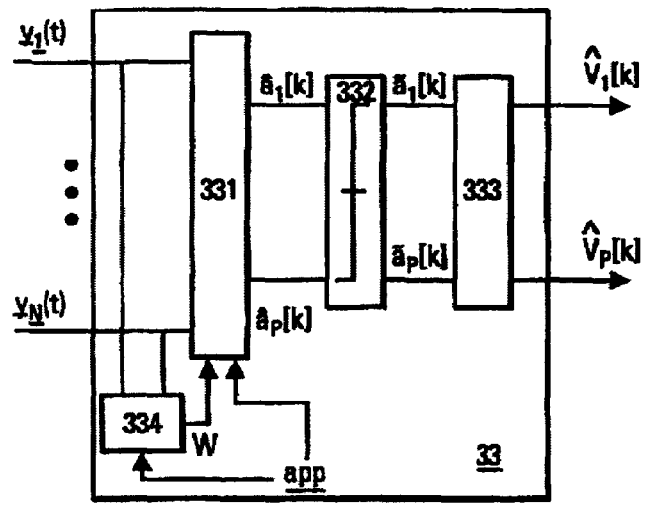
Figure 5B:
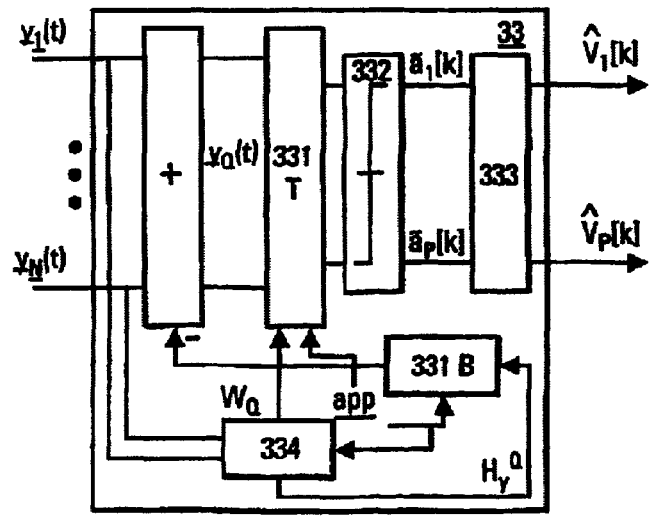

The advantages and features of the invention will be clearer on reading the following description, given as an example, illustrated by the attached figures representing in:

FIG. 1, a transmission-reception system with BLAST type architecture according to the state of the art, FIG. 2, an example of transmission system according to the invention, FIGS. 3a, 3b and 3c some examples of filtering by the modulator-transmitters of the transmission system according to the invention, FIG. 4, an example of a receiver according to the invention, FIGS. 5a and 5b some examples of estimation and decoding systems according to the invention.

In a transmission-reception system according to the invention, the useful data d[i] is formatted as a vector of dimension P by the device 11 in a space-time encoder 1, as shown on FIG. 2. The data vectors m[k] so obtained can then be encoded $\{12^1 \ldots 12^P\}$. Apprenticeship sequences app known by the receiver in the device 13 are added to the symbol vectors c[k] o obtained. The symbols v[k] so obtained are then modulated by the modulation and transmission devices $\{2^1 \ldots 2^P\}$. The devices $\{21^1 \ldots 21^P\}$ apply the chosen modulation constellation (for example the constellation −1, +1 with BPSK modulation) and generate the resulting symbol vector a[k].

Each symbol of the vector a[k] so obtained, the symbols a[k] representing the modulation states, can, using the device $22^p$ of the modulator-transmitter $2^p$, be formatted as a signal vector $U_p^k$(t):

$$\underline{u}_p^K(t = kTs + i) = \begin{bmatrix} u_p(t) \\ \vdots \\ u_p(t-K+1) \end{bmatrix} = \begin{bmatrix} \underline{0}_i \\ a_p[k] \\ \underline{0}_{Ts-1} \\ a_p[k-1] \\ \vdots \end{bmatrix} \text{ for } 0 \leq i < Ts$$

with $0_T = [0 \ldots 0]^T$ and dim($0_T$)=T×1 with T=i or T=Ts−1 where $T_s$ is the symbol time. The realization of this vector $U_p^k$(t) represents an oversampling of the symbols $a_p$[k] in order to satisfy Shannon's theorem. The vector $U_p^k$(t) is then filtered by the formatting filter of device $22^P$. These filters $\{22^1 \ldots 22^P\}$ are the formatting filters of the chosen modulation (Gaussian filter, for example, with GMSK type modulation) and/or the transmission filter as such (wave formatting filter of type Nyquist, NRZ, etc.) and/or any other filter contained by the modulator-transmitters $\{2^1 \ldots 2^P\}$. This device $22^P$ forms a filter whose continuous time function is $h_p$(t) (0≦t≦K, τ≧0):

$$s_p(t-\tau) = \sum_{i=0}^{K-1} h_p(i-\tau) u_p(t-i)$$

$$= [h_p(-\tau) \cdots h_p(K-1-\tau)] \cdot \begin{bmatrix} u_p(t) \\ \vdots \\ u_p(t-K+1) \end{bmatrix}$$

$$= \underline{h}_p(\tau)^T \underline{u}_p^K(t)$$

The signal $s_p$(t) resulting from this filtering is transmitted by the $p^{th}$ antenna $24^P$ of the transmission antenna network, after modulation with carrier frequency $f_0$ using device $23^P$.

The signals $r_p(t)$ modulated by a carrier frequency $f_0$ then give the transmission signals $s_p(t)$ according to the relation:

$$s_p(t) = r_p(t)^* \exp(j2\pi f_0 t),$$

The P modulator-transmitters $\{2^p\}_{(1 \leq p \leq P)}$ then transmit signals related to independent symbols.

Device 13 used to add apprenticeship sequences can also be positioned before device 11, between device 11 and the encoders $\{12^1 \ldots 12^P\}$ or even before or after the modulation constellation application devices $\{21^1 \ldots 21^P\}$ or the filters $\{22^1 \ldots 22^P\}$, etc.

The modulators $\{2^1 \ldots 2^P\}$ can be linear or linearizable, and with or without memory. For a linear modulator without memory, the signal $s_p(t)$ depends only on the symbols a[k] at instant k. For modulation with time memory of dimension K, the signal $s_p(t)$ also depends on vectors a[k−1] to a[k−K] (K≧1).

The filters $\{h_p(t)\}_{(1 \leq p \leq P)}$ are all different from each other so that the receiver can also operate for a propagation channel with networks of colocalized antennas when the number of transmitters is greater than the number of paths (P≧M), especially for a single path propagation channel.

FIGS. 3a, 3b and 3c show examples of realization of these different filters $\{h_p(t)\}_{(1 \leq p \leq P)}$ in order to meet this condition of time diversity of the P modulator-transmitters $\{2^p\}_{(1 \leq p \leq P)}$.

This time diversity can be created in various ways:
- by desynchronizing the signals transmitted by the P modulator-transmitters $\{2^p\}_{(1 \leq p \leq P)}$,
- by filtering with filters $\{22^p\}_{(1 \leq p \leq P)}$ of different types: Nyquist, NRZ, etc. the symbols transmitted by the P modulator-transmitters,
- by transmitting the signals s(t) transmitted by the P modulator-transmitters $\{2^p\}(1 \leq p \leq P)$ on different carrier frequencies $\{f_p\}_{(1 \leq p \leq P)}$, spectrum overlap between the various transmitters being possible unlike with OFDM (Orthogonal Frequency Division Multiplexing), etc.

On FIG. 3a, each filter $h_p(t)$ comprises an element giving the type h of the filter and a delay element $\tau_p$ with $\tau_1 \neq \tau_2 \neq \ldots \neq \tau_p$ such that $h_p(t) = h(t - \tau_p)$ for all values of p.

On FIG. 3b, the types $h_p$ of the filters are all different from each other ($h_1 \neq h_2 \neq \ldots h_p$). Nyquist filters with roll-off $\alpha$, NRZ filters, etc. can be used.

NRZ: $h_p(t) = \Pi_{Ts}(t)$, i.e. $h_p(t) = 1$ if $|t| < Ts/2$ and $h_p(t) = 0$ if $|t| < Ts/2$ Nyquist with roll-off $\alpha$: $h_p(t) = \dfrac{\cos\dfrac{\pi \alpha t}{Ts}}{1 - 4\dfrac{\alpha^2 t^2}{Ts^2}} \text{sinc}\left(\dfrac{\pi t}{Ts}\right)$ The filters $h_p$ can, for example, all be Nyquist filters with different roll-off values $\alpha_p$.

On FIG. 3c, each filter $h_p(t)$ comprises an element giving the type h of the filter and an element used to give a frequency shift to the signal $r_p(t)$, with $h_p(t) = h \cdot \exp(j2\pi f_p t)$, such that the frequencies are all different $f_1 \neq f_2 \neq \ldots \neq f_p$.

We will consider the case of networks of colocalized transmission and reception antennas, the transmission antenna $24^P$ of the modulator-transmitter $2^P$ sends a signal $s_p(t)$ which takes, for example, M paths as M plane waves of incidence $\theta_m^T$ ($1 \leq m \leq M$) that the N reception antennas of receiver 3 receive as M plane waves of incidence $\theta hd$ $m^R$ as shown on FIG. 1.

Under these conditions, the signals x(t) observed by receiver 3 of the receiver on FIG. 4 can be expressed as follows:

$$x(t) = \sum_{p=1}^{P} \sum_{m=1}^{M} \rho_m \cdot G_p(\theta_m^T) \cdot \underline{d}(\theta_m^R) \cdot s_p(t - \tau_m) + \underline{b}(t)$$

where $\tau_m$ and $\rho_m$ are respectively the delay and the attenuation of the $m^{th}$ path with respect to the direct path. The signal $s_p(t)$ depends on the transmitted symbols a[k] contained in the vectors $u_p^k(t)$ according to the relations given in the description on FIG. 2. The signal x(t) can then be expressed, according to the symbol vectors $u_p^k(t)$ for $1 \leq p \leq P$:

$$x(t) = \sum_{p=1}^{P} \sum_{m=1}^{M} \rho_m \cdot G_p(\theta_m^T) \cdot \underline{d}(\theta_m^R) \cdot h_p(\tau_m) \cdot \underline{u}_p^K(t) + \underline{b}(t)$$

$$= \sum_{p=1}^{P} H_p \cdot \underline{u}_p^K(t) + \underline{b}(t)$$

This last expression shows that the transfer functions $H_p$ of the P modulator-transmitters $\{2^p\}_{(1 \leq p \leq P)}$ differ in the filter of function $h_p(\tau_m)$ and the gain $G_p(\theta_m^T)$ of the transmission antenna $24^p$.

The observation x(t) is transmitted by the various reception devices and filters $\{31^n\}_{(1 \leq n \leq N)}$, comprising at least a carrier recovery device used to put the received signal in the baseband with one windower 32

$$\underline{x}(kTs + i) = \sum_{j=0}^{J-1} [H_1(i + jTs) \cdots H_P(i + jTs)] \cdot \begin{bmatrix} a_1[k-j] \\ \vdots \\ a_P[k-j] \end{bmatrix} + \underline{b}(t)$$

$$= \sum_{j=0}^{J-1} H(i + jTs) \cdot \underline{a}[k-j] + \underline{b}(t)$$

where $H_p(j)$ is the $j^{th}$ column of matrix $H_p$.

To better identify the vector a[k], in fact, device 32 windows the spatial observation x(t) so that a space-time observation y(t) is obtained. Given that the vectors x(kTs+i), with $0 \leq i > Ts$, depend on the symbol vectors a[k] to a[k−J+1], the next vector v(t) is formed.

$$\underline{y}(t) = \begin{bmatrix} \underline{x}(t) \\ \underline{x}(t-1) \\ \vdots \\ \underline{x}(t+L-1) \end{bmatrix}$$

$$\underline{y}(t = kTs + i) = \begin{bmatrix} \underline{x}(kTs = i) \\ \vdots \\ \underline{x}(kTs + i + L - 1) \end{bmatrix}$$

$$= \sum_{j=0}^{J-1} \begin{bmatrix} H(jTs + i) \\ H(jTs + i + 1) \\ \vdots \\ H(jTs + i + L - 1) \end{bmatrix} \cdot \underline{a}[k-j] + \underline{b}_y(t)$$

$$\underline{y}(t = kTs + i) = \sum_{j=0}^{J-1} H_y(jTs + i) \cdot \underline{a}[k-j] + \underline{b}_y(t)$$

The estimator-demodulator 33 estimates the symbols ak] and detects their modulation states $\tilde{\underline{a}}[k]$ and deduces by demodulation ^v[k]. Device 41 of the space-time decoder 4 removes the apprenticeship sequences app. Device 42 then decodes the estimated useful symbols. Multiplexer 43 converts the decoded symbol vectors of dimension P into a flow of estimated data ^d[i]. The position in the reception system of device 41 removing the apprenticeship sequences depends on the position in the transmission system 1 of device 14 adding these apprenticeship sequences.

The estimator-demodulator 33 can be made from traditional devices adapted to the model of the above expression of the space-time observation y(t), i.e. bi-dimensional. Two examples of realization are given on FIGS. 5a and 5b.

FIG. 5a shows an estimator-demodulator 33 of symbols a[k] to a[k−J+1] in the sense of the least squares using the observation y(t): MMSE algorithm. The Wiener W filter 331 which satisfies a[k]=W.y(t) is first estimated by the filter coefficient estimation device 334 using the apprenticeship sequences app, then secondly applied outside these apprenticeship sequences to the space-time observations v(t) to estimate the vectors symbols a[k−J], (0≦j<J−1), whose modulation state is then detected by detectors 332 and lastly demodulated by demodulator 333.

FIG. 5b shows an estimator-demodulator 33 using the signals ã[k−Q+1] ... ã[k−J +1] previously estimated and demodulated to estimate in the sense of the least squares the last Q signals a[k] ... a[k−Q]: decision feed-back equalization (DFE) algorithm. Initialization of the filtering can be done by the last (J-Q) symbols of the apprenticeship sequences app. Once the vectors a[k] to a[k−Q] have been estimated, their states are detected and the symbols ã[k] ... ã[k−Q] are deduced. The algorithm can therefore be summarized as follows:

Filter estimation: estimation of $H_y$ from app by device 334,
Filtering initialization: ã[k−Q+1] ... ã[k−J+1]=app,
Instant k: Formation of $y_Q(t)$ using filter 331B and the adder $$\underline{y}_Q(t) = \underline{y}(t) - \sum_{j=Q}^{J-1} H_y(jTs) \cdot \tilde{a}[k-j] = H_y^Q \cdot \tilde{a}_Q[k]$$

with $\tilde{a}_Q[k] = [\tilde{a}[k]^T \cdots \tilde{a}[k-Q-1]^T]^T$

Estimation of $a_Q[k]$ by filter 331T $$\bar{a}[k] = (H_y^Q \cdot H_y^{Qt})^{-1} \cdot H_y^{Qt} \cdot \underline{y}_Q(t)$$

Detection of the modulation states of $\hat{a}_Q[k]$ by detector 332

Demodulation by demodulator 333 => $\bar{a}_p[k]$.

The coefficients of the transverse (331T) and recursive (331B) filters, respectively $\hat{W}_Q$ and $\hat{H}_y^Q$ can be estimated:
$\hat{W}_Q$ with the same zero-forcing method by using $\hat{H}_y^Q$ $$\hat{W}_Q = R_{\underline{app}_y \cdot y} R_{y \cdot y}^{-1} \quad \text{and} \quad \hat{H}_y^Q = R_{y \cdot \underline{app}_y} R_{\underline{app}_y \cdot \underline{app}_y}^{-1}$$

$\hat{W}_Q$ in the sense of maximum resemblance with the Wiener method according to the following equation:

$$\hat{W}_Q = R_{\underline{app}_y \cdot y} R_{y \cdot y}^{-1} \quad \text{and} \quad \hat{H}_y^Q = R_{y \cdot \underline{app}_y} R_{\underline{app}_y \cdot \underline{app}_y}^{-1}$$

with $R_{y \cdot y}$ self-correlation of observations $y_Q(t)$ containing the apprenticeship sequence app, and $R_{app_y \cdot app_y}$ intercorrelation of the observations y(t) containing the apprenticeship sequence app and the apprenticeship sequence app.

$\hat{H}_y^Q$ is estimated from the matrix $\hat{H}_y = [\hat{H}_y^Q \ldots]$. Given that the matrix $H_y$ is estimated in the sense of the least square:

$$\hat{W}_Q = R_{\underline{app}_y \cdot y} R_{y \cdot y}^{-1} \quad \text{and} \quad \hat{H}_y^Q = R_{y \cdot \underline{app}_y} R_{\underline{app}_y \cdot \underline{app}_y}^{-1}$$

where $R_{app_y \cdot app_y}$ self-correlation of the apprenticeship sequence app, and $R_{app_y \cdot app_y}$ and $R_{app_y \cdot app_y}$ intercorrelation of the observations y(t) containing the apprenticeship sequence app and the apprenticeship sequence app.

A third example of realization could be an estimator-demodulator 33 comprising an estimator using the Viterbi type algorithm seeking all possible states of the set {a[k] ... a[k−J+1]} which minimizes the difference between y(t) and $H_y$.a[k] and a demodulator 333 by deducing ^v[k].

These three examples of realization are not limiting, the estimator must simply be able to take into account the two spatial and time dimensions of the observation y(t). For example, this space-time estimator of device 33 can be realized by a Viterbi type space-time algorithm or two dimensional filtering techniques (transverse filtering, decision feedback filter, echo cancellation, etc.) for which the filters are estimated by algorithms of type MMSE, SGLS, RLS, Viterbi, Viterbi with weighted inputs and/or outputs, etc.

The transmission-reception system using such estimator-demodulators 33 operates irrespective of the channel, with a network of transmission-reception antennas colocalized or not, modulation being linear or linearizable, with or without memory, if the P modulator-transmitters have time diversity.

By introducing time diversity, the number of reception antennas N can be greater than, equal to or less than the number of transmission antennas P, in particular if different carrier frequencies are used for each transmitting antenna.

This transmission-reception system can be used to transmit digital signals in non-colocalized networks. It can also be used to transmit digital signals in colocalized networks if the number P of transmission antennas $\{24^1 \ldots 24^P\}$ is less than or equal to the number pf paths M (M≧1) of a transmitted signal transmitted by these transmission antennas on the transmission channel (P≦M), but also if the number P of transmission antennas $\{24^1 \ldots 24^P\}$ is greater than or equal to the number pf paths M (P≧M).

This transmission-reception system can be used to choose the transmission either of digital signals of several users or digital signals at high speed for one user. It is quite suitable for all types of network using several transmission antennas where it is necessary to choose between low, medium or high speed transmission for, for example, telephony, radio-broadcasting, television, transmission of interactive digital data (Internet), etc. irrespective of the network used such as, for example, the radio network, satellite, etc., in a transmission environment generating or not multiple reflections.

The invention claimed is:

1. A digital signal transmission system comprising:
   a space-time encoder receiving a flow of data to be transmitted d[i], encoding this data d[i] as symbol vectors m[k] of dimension P(P>1) and generating said symbol vectors m[k], and
   P modulator-transmitters $\{2^P\}_{(1 \leq p \leq P)}$, each receiving one component $m_p[k]$ of the symbol vector m[k] output from the space-time encoder, applying the constellation of a predetermined modulation to said symbol $m_p[k]$ to obtain symbol $a_p[k]$, and converting the symbol obtained, $a_p[k]$, into a signal $s_p(t)$ transmitted on said antenna ($24^p$) connected to said transmitter ($2^p$)

wherein the transmitters are adapted to transmit signals s(t) with time diversity, wherein P modulator-transmitters $\{2_p\}$:

each produce said symbol $a_p[k]$ in parallel at instant k, each form a filter of function $h_p(t)$ comprising a delay element $\tau_p$ with $\tau_1 \neq \tau_2 \neq \ldots \tau_p$, such that $h_p(t)=h_p(t-\tau_{92})$ for all values of p, such that the function $h_p(t)$ of the transmitter ($2^p$) is different from those of the other transmitters $\{2^q\}_{(q \neq p)}$: $h_1(t) \neq h_2(t) \neq \ldots \neq h_p[(t)$, each generate at their respective transmission antennas the signal $s_p[k]$ corresponding at least to the filtering by the function $h_p(t)$ of the symbols $a_p[k]$; and wherein the digital signal transmission system further comprises a wave form $h_p$, wherein $h_1 \neq h_2 \neq \ldots \neq h_P$ for all values of p wherein ($1 \leq p \leq P$).

2. The transmission system according to claim 1, wherein the function $h_p(t)$ has one or more of the following features:

any wave form h not identical to the function $h_q(t)$ of the transmitter ($2^q$, $q \neq p$) and a delay $\tau_p$ delaying the transmission of the received symbol $a_p[k]$ by said duration $\tau_p$, such that the function $h_p(t)=h(t-\tau_p)$ with $\tau_1 \neq \tau_2 \neq \ldots \neq \tau_p$ for all values of $p(1 \leq p \leq P)$, any wave form h not identical to the function $h_q(t)$ of the transmitter ($2^q$) ($q \neq p$) and a frequency shift $f_p$ such that the function of the filter $h_p(t)=h \cdot \exp(j2\pi f_p t)$ with $f_1 \neq f_2 \neq \ldots \neq f_p$ for all values of $p(1 \leq p \leq P)$, a wave form $h_p$ is one of type NRZ, Nyquist with roll-off $\alpha$ or $\alpha_p$.

3. The transmission system according to claim 1:

wherein said space-time encoder comprises at least a demultiplexer with P channels generating a symbol vector m[k] AND or OR at least one or more of the following devices:

an encoder generating a symbol vector c[k], a device used to add at least an apprenticeship sequence app known by the receiver to the useful symbol vectors m[k] or encoded symbol vectors c[k] in order to create the symbol vectors v[k], AND or OR wherein each modulator-transmitter comprises one or more of the following devices:

a linear or linearizable modulator, a modulator with or without time memory, a BPSK or GMSK modulator, a device applying the constellation of said predetermined modulation to the received symbols $v_p[k]$ generating the symbols $a_p[k]$, a device used to add at least the $p^{th}$ component of an apprenticeship sequence app known by the receiver to the symbols $a_p[k]$, a filter filtering the constellated symbols $a_p[k]$, a filter filtering the vector of oversampled symbols $$\underline{u}_p^K(t=kTs+i) = \begin{bmatrix} u_p(t) \\ \vdots \\ u_p(t-K+1) \end{bmatrix} = \begin{bmatrix} \underline{0}_i \\ a_p[k] \\ \underline{0}_{Ts-1} \\ a_p[k-1] \\ \vdots \end{bmatrix} \text{ for } 0 \leq i < Ts$$

with $\underline{0}_i = [0 \cdots 0]^T$ and $dim(\underline{0}_i) = i \times 1$ an element to modulate the signal to be transmitted on the carrier frequency $f_0$.

4. An estimator-demodulator receiving in parallel N signals y(t) formed from L samples resulting from the transmission of digital signals by a transmission system according to claim 1, wherein these signals y(t) represent a space-time observation since each of the N spatial components comprises L samples:

wherein the estimator-demodulator comprises at least the following devices:

a first recursive two dimensional filter $\hat{H}_y^Q$ receiving an estimation of coefficients and the symbols already detected $\bar{a}(k-Q) \ldots \bar{a}(k-J+1)$, an adder used to remove the vector which is the result of the first filter applied to the received observations y(t) and obtain $v_q(t)$, a second transverse two dimensional filter $\hat{W}_Q(t)$ receiving $y_Q(t)$ and an estimation of coefficients and generating estimated received symbols $\hat{a}_Q[k]$, a detector of the modulation states of the estimated symbols $\bar{a}[k]=\hat{W}_q\, y(t)$ generating the detected symbols $\bar{a}[k]$, then a demodulator generating the symbols $\hat{v}[k]$.

an estimator of the coefficients $\hat{W}_Q$ of the transverse filter and $\hat{H}_y^Q$ of the recursive filter.

5. The estimator-demodulator of the signals transmitted by a transmitter according to claim 4, wherein the estimator-demodulator comprises at least a two dimensional estimator-demodulator of the symbols $\{a[k] \ldots a[k-J+1]\}$ using a Viterbi algorithm.

6. A digital signal reception system comprising:

a receiver comprising at least a network of N reception antennas and an estimator-demodulator according to claim 4, and a space-time decoder wherein said receiver comprises at least:

N reception devices $\{31^n\}_{(1 \leq n \leq N)}$, comprising at least an element used to put the received signal in the baseband, generating an observation vector x(t) of dimension N, a windower producing from observations x(t) the discrete observations x[kTs+i] with t=kTs+i and $0 \leq i \leq Ts$ given that the observations x[kTs+i] depend on the transmitted signal vectors a[k] to a[k−J+1] and generating a space-time observation $$\underline{y}(t) = \begin{bmatrix} x(t) \\ x(t-1) \\ \vdots \\ x(t+L-1) \end{bmatrix}$$

from N observations x(t),

AND or OR wherein the space-time decoder comprises at least one or more of the following devices:

an element capable of removing the apprenticeship sequences app, a decoder with P channels in input/output, a multiplexer with P channels in input; and a wave form $h_p$, where in $h_1 \neq h_2 \neq \ldots \neq h_p$ for all values of p wherein ($1 \leq p \leq P$).

7. A digital signal reception system according to claim 6, wherein the number of transmission antennas P of said transmission system is greater than or equal to the number of paths $M(P \geq M)$.

8. A digital signal reception system according to claim 6, wherein the number of transmission antennas P of said transmission system is less than or equal to the number of paths M (P≧M).

9. An estimator-demodulator receiving in parallel N signals y(t) formed from L samples resulting from the transmission of digital signals by a transmission system according to claim 1, wherein these signals y(t) represent a space-time observation since each of the N spatial components comprises L samples, wherein the estimator-demodulator comprises at least the following devices:

a two dimensional Wiener filter estimator, an estimated two dimensional filter $\hat{W}_Q$ receiving the observations y(t) and the estimation of the coefficients of said filter $\hat{W}_Q$, a detector of the modulation states of the estimated symbols $\bar{\tilde{a}}[k]=\hat{W}_Q y(t)$ generating the symbols detected $\bar{a}[k]$, then a demodulator generating the symbols ˆv[k]; and a wave form $h_p$, wherein $h_1 \neq h_2 \neq \ldots \neq h_P$ for all values of p wherein (1≦p≦P).

10. The estimator-demodulator according to claim 9, wherein the estimator-demodulator further comprising the filter estimator is an estimator either in the sense of maximum resemblance, the sense of least squares, or using a Viterbi algorithm, the demodulator corresponds to a modulation of one or more of the following types: linear, linearizable, with time memory, without time memory, BPSK, GMSK, at least some of the received signals v(t) represent an apprenticeship sequences app known by said estimator-demodulator allowing one or more of the following operations:

estimation of said filter, estimation in the sense of the least squares of a recursive filter such that coefficients $\hat{H}_y^Q$ are the first Q columns of the matrix $$\hat{H}_y^Q = R_{y \cdot \underline{app}_y} R_{\underline{app}_y \cdot \underline{app}_y}^{-1},$$

estimation with the zero-forcing method of a transverse filter such that coefficients are $$\hat{W}_Q = R_{\underline{app}_y \cdot y} R_{y \cdot y}^{-1},$$

estimation using the Wiener method in the sense of maximum resemblance of a filter such that coefficients are $$\hat{W}_Q = R_{\underline{app}_y \cdot y} R_{y \cdot y}^{-1},$$

initialization of the estimation of filter(s)
initialization of filtering,
initialization of the Viterbi algorithm of the estimator-demodulator.

11. The digital signal transmission system comprising transmission system according to claim 1, and a reception system comprising an estimator-demodulator receiving in parallel N signals y(t) formed from L samples, wherein these signals y(t) represent space-time observation since each of the N spatial components comprises L samples, comprising, in addition, at least a transmission channel such that a signal $s_p(t)$ transmitted by said transmission system takes M separate paths (M≧1) in said transmission channel before reaching said reception system.

12. The estimator-demodulator of signals transmitted by a transmitter according to claim 11, wherein the estimator-demodulator comprises at least the following devices:

a two dimensional Wiener filter estimator, an estimated two dimensional filter $\hat{W}_Q$ receiving the observations y(t) and the estimation of the coefficients of said filter $\hat{W}_Q$, a detector of the modulation states of the estimated symbols $\bar{\tilde{a}}[k]=\hat{W}_Q y(t)$ generating the symbols detected $\bar{a}[k]$, then a demodulator generating the symbols ˆv[k],

13. The estimator-demodulator of the signals transmitted by a transmitter according to claim 11, wherein the estimator-demodulator comprises at least the following devices:

a first recursive two dimensional filter $\hat{H}_y^Q$ receiving said estimation of coefficients and the symbols already detected $\bar{a}(k-Q) \ldots (k-J+1)$, an adder used to remove the vector which is the result of the first filter applied to the received observations y(t) and obtain $v_q(t)$, a second transverse two dimensional filter $\hat{W}_Q$ receiving $y_Q(t)$ and said estimation of coefficients and generating the estimated received symbols $\hat{a}_Q[k]$, a detector of the modulation states of the estimated symbols $\bar{\tilde{a}}[k]=\hat{W}_q y(t)$ generating the detected symbols $\bar{a}[k]$, then a demodulator generating the symbols ˆv[k], an estimator of the coefficients $\hat{W}_Q$ of the transverse filter and $\hat{H}_y^Q$ of the recursive filter.

14. The estimator-demodulator of the signals transmitted by a transmitter according to claim 11, wherein the estimator-demodulator comprises at least a two dimensional estimator-demodulator of the symbols {a[k] . . . a[k−J+1]} using a Viterbi algorithm.

15. The estimator-demodulator according to claim 11, wherein the estimator-demodulator comprises:

the filter estimator is an estimator either in the sense of maximum resemblance, the sense of least squares, or using a Viterbi algorithm, the demodulator corresponds to a modulation of one or more of the following types: linear, linearizable, with time memory, without time memory, BPSK, GMSK, at least some of the received signals v(t) represent an apprenticeship sequences app known by said estimator-demodulator allowing one or more of the following operations:

estimation of said filter, estimation in the sense of the least squares of a recursive filter such that its coefficients $\hat{H}_y^Q$ are the first Q columns of the matrix $$\hat{H}_y^Q = R_{y \cdot \underline{app}_y} R_{\underline{app}_y \cdot \underline{app}_y}^{-1},$$

estimation with the zero-forcing method of a transverse filter such that coefficients are $$\hat{W}_Q = R_{\underline{app}_y,y} R_{y,y}^{-1},$$

estimation using the Wiener method in the sense of maximum resemblance of a filter such that coefficients are $$\hat{W}_Q = R_{\underline{app}_y,y} R_{y,y}^{-1},$$

initialization of the estimation of filter(s),
initialization of filtering,
initialization of the Viterbi algorithm of the estimator-demodulator.

16. A digital signal transmission method comprising the steps of:
   a space-time encoding step comprising at least the encoding of the flow of data to be transmitted d[i] as symbol vectors m[k] of dimension P)P>1), and
   a modulation-transmission step comprising:
      application in parallel of the constellation of a predetermined modulation to the P symbols m[k] to obtain constellated symbols $a_p[k]$,
      transmission in parallel of the P signals s(t) obtained from the constellated symbols a[k] from P spatially separate points,
   wherein the modulation-transmission step is adapted to transmit the signals s(t) with time diversity, wherein P modulator-transmitters $\{2^P\}$:
      each produce a symbol $a_p[k]$ in parallel at instant k,
      each form a filter of function $h_p(t)$ comprising a delay element $\tau_\rho$ with $\tau_1 \neq \tau_2 \neq \ldots \tau_\rho$, such that $h_p(t)=h_p(t-\tau_\rho)$ for all values of p, such that the function $h_p(t)$ of the transmitter $(2^P)$ is different from those of the other transmitters $\{2^q\}_{(q \neq p)}$:: $h_1(t) \neq h_2(t) \neq \ldots \neq h_P[(t)$,
      each generate at their respective transmission antennas the signal $s_p[k]$ corresponding at least to the filtering by the function $h_p(t)$ of the symbols $a_p[k]$; and
      each generates a waveform $h_p$, wherein $h_1 \neq h_2 \neq \ldots \neq h_P$ for all values of p wherein ($1 \leq p \leq P$).

17. The transmission method according to claim 16, wherein the modulation-transmission step comprises, in addition, at least, on each channel $p(1 \leq p \leq P)$, filtering of symbols $a_p[k]$ generating a signal $s_p(t)$ such that the filtering of channel p is different from carried out on the other P−1 parallel channels.

18. The transmission method according to claim 17, wherein said filtering carried out on channel p has one or more of the following features:
   any wave form h identical or not to the channel q, for all values of p and $q(1 \leq q \neq p \leq P)$ and a delay of duration $\tau_p$ different from channel q,
   any wave form h identical or not to the channel q, for all values of p and $q(1 \leq q \neq p \leq P)$ and a frequency shift $f_p$ different from channel q, a form $h_p$ different from channel q, for all values of p and $q(1 \leq q \neq p \leq P)$; and
   a wave form $h_p$, wherein $h_1 \neq h_2 \neq \ldots \neq h_P$ for all values of p wherein ($1 \leq p \leq P$).

* * * * *